United States Patent
Hsu et al.

[11] Patent Number: 6,115,500
[45] Date of Patent: Sep. 5, 2000

[54] METHOD AND DEVICE FOR COMPRESSING IMAGE DATA

[75] Inventors: Chao-Shuenn Hsu, Tainan Hsien; J. F. Chen, Chiayih Hsien, both of Taiwan

[73] Assignee: Winbond Electronics Corp., Hsinchu, Taiwan

[21] Appl. No.: 08/924,444

[22] Filed: Aug. 26, 1997

[30] Foreign Application Priority Data

May 6, 1997 [TW] Taiwan ................................ 86106023

[51] Int. Cl.⁷ .............................. G06K 9/36; G06K 9/46
[52] U.S. Cl. ............................ 382/248; 382/250
[58] Field of Search ..................... 382/166, 232, 382/248, 250, 246; 364/715.02, 725.03; 348/384, 390, 403, 404

[56] References Cited

U.S. PATENT DOCUMENTS

| | | | |
|---|---|---|---|
| 5,146,324 | 9/1992 | Miller et al. | 358/133 |
| 5,434,673 | 7/1995 | Inoue et al. | 358/335 |
| 5,510,904 | 4/1996 | Itoi | 358/336 |
| 5,659,362 | 8/1997 | Kovac et al. | 348/384 |

*Primary Examiner*—Phuoc Tran
*Attorney, Agent, or Firm*—Ladas & Parry

[57] ABSTRACT

Zigzag scanning is one of the key techniques in image data compression. An efficient method and device is needed in some dedicated cases. In the present invention, a fixed delay is performed between DCT and zigzag scan to make the present invention simple. The present invention requires only half the number of transistors compared to the prior art.

18 Claims, 2 Drawing Sheets

$D_{00}$ $D_{01}$ $D_{02}$ $D_{03}$ $D_{04}$ $D_{05}$ $D_{06}$ $D_{07}$
$D_{10}$ $D_{11}$ $D_{12}$ $D_{13}$ $D_{14}$ $D_{15}$ $D_{16}$ $D_{17}$
$D_{20}$ $D_{21}$ $D_{22}$ $D_{23}$ $D_{24}$ $D_{25}$ $D_{26}$ $D_{27}$
$D_{30}$ $D_{31}$ $D_{32}$ $D_{33}$ $D_{34}$ $D_{35}$ $D_{35}$ $D_{37}$
$D_{40}$ $D_{41}$ $D_{42}$ $D_{43}$ $D_{44}$ $D_{45}$ $D_{46}$ $D_{47}$
$D_{50}$ $D_{51}$ $D_{52}$ $D_{53}$ $D_{54}$ $D_{55}$ $D_{56}$ $D_{57}$
$D_{60}$ $D_{61}$ $D_{62}$ $D_{63}$ $D_{64}$ $D_{65}$ $D_{66}$ $D_{67}$
$D_{70}$ $D_{71}$ $D_{72}$ $D_{73}$ $D_{74}$ $D_{75}$ $D_{76}$ $D_{77}$

| 37 | 15 | 4 | 2 | 0 | 0 | 0 | 0 |
| --- | --- | --- | --- | --- | --- | --- | --- |
| 21 | 9 | 3 | 0 | 0 | 0 | 0 | 0 |
| 11 | 7 | 0 | 0 | 0 | 0 | 0 | 0 |
| 5 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

```
 0   1   5   6  14  15  27  28
 2   4   7  13  16  26  29  42
 3   8  12  17  25  30  41  43
 9  11  18  24  31  40  44  53
10  19  23  32  39  45  52  54
20  22  33  38  46  51  55  60
21  34  37  47  50  56  59  61
35  36  48  49  57  58  62  63
```
FIG. 3a
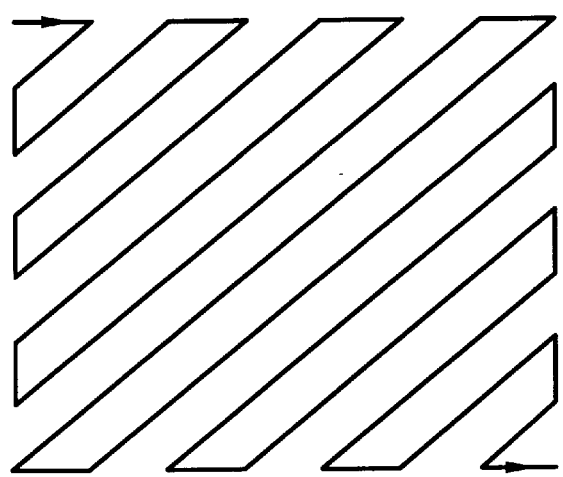
FIG. 3b
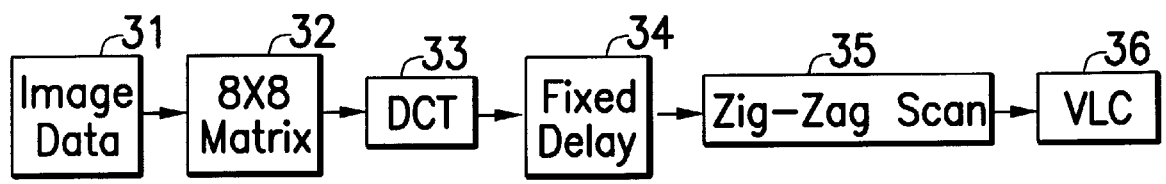
FIG. 4

METHOD AND DEVICE FOR COMPRESSING IMAGE DATA

BACKGROUND OF THE INVENTION

1. Field of the Invention

The present invention relates to a method and device for compressing image data by performing zigzag scanning after a fixed delay.

2. Description of the Related Art

In general, huge amounts of image data extracted from an image form the cornerstone of real-time image applications. A system with powerful functions is typically used to process the huge amounts of data. However, powerful functions typically result in complicated circuitry and high cost. Speeding up the transmission rate using high-frequency transmission is a difficult and high-cost solution, since transmission line and media problems must still be dealt with.

Thus, it becomes more and more important to effectively and correctly reduce the volume of image data. Industrial standards, such as moving picture experts group (MPEG) and joint photographic experts group (JPEG), have introduced zigzag scanning to handle converted data resulting from discrete cosine transformation (DCT).

FIG. 1 is an image compression system of the prior art. At the beginning, image data 11 is distributed to an 8×8 matrix 12 as shown in FIG. 2a. Through DCT 13, the 8×8 matrix 12 will be converted from time domain to frequency domain as shown in FIG. 2b. Referring to FIG. 2b, almost all cells of the converted 8×8 matrix are reduced to zero after processing by DCT 13, except for the upper-left corner.

Meanwhile, DCT has a specific data output sequence. 8 elements of the first row of the converted matrix are not generated until the 8th clock after matrix conversion starts, and so forth. That is, the elements of the 8th row are generated after 8×8=64th clock.

Zigzag scanning is performed by zigzag scanning 14 after DCT 13. Zigzag scanning 14 can serialize the converted 8×8 matrix into a serial chain by placing nonzero values in the front of the serial chain and all zeroes to the end by a specific sequence shown in FIG. 3a and FIG. 3b. In FIG. 3a, the specific sequence of zigzag scanning is depicted by numbers, wherein "0" represents that the related element in the converted 8×8 matrix is output first and so forth. To show the output sequence more clearly, FIG. 3b utilities arrows to depict the scan sequence. From FIG. 3b, it becomes apparent why this scan methodology is called "zigzag" scanning.

In an image compressing method, a successive data reading and writing is neccessary. Given the characteristics of DCT, it should be noticeable when the image data is read from the converted matrix and written to the serial chain. That is, data can not be read from the converted matrix before it is valid, and must be written into the serial chain before it is over-written.

After the zigzag scanning 14 is performed, a variable length coding (VLC) 15 is performed. VLC 15 codes a source code of fixed length into a target code of variable length. Usually, coding sources frequently occurring as short target code would highly compress the length of source codes. By introducing VLC, a compression rate of 1/30 or even 1/200 can be achieved.

However, reliance on different clock delays for reading and writing elements in each row of the 8×8 matrix when performing the zigzag scan is a disadvantage of the prior art in that it requires complicated circuitry. To archive a complicated circuitry means a lot of transistors is used.

SUMMARY OF THE INVENTION

Thus, the present invention provides a method and device for compressing image data by introducing a fixed delay to overcome the disadvantages of the prior art. The present invention performs a fixed delay of 36 or 37 clocks between DCT and zigzag scanning to provide a simple method and device for compressing image data. In accordance with the present invention, to implement the simple method and device for compressing image data requires only about half the number of transistors as that required by the prior art as above discussed. So, cost of implementing the present invention is lower than that of prior art.

In addition, the present invention provides a device for compressing image data which comprises: a matrix distributer, distributing the image data into a first matrix; a converter, converting the first matrix into a second matrix; a means for fixed delay, introducing a fixed delay after the conversion starts simultaneously; and a scanning device, performing a zigzag scan to read each row of the second matrix into a serial chain.

Other objectives, features, and advantages of the present invention will become apparent from the following detailed description made with reference to an illustrative but non-limiting embodiment.

DESCRIPTION OF THE DRAWINGS

The following detailed description is made with reference to the accompanying drawings, in which:

FIG. 3a and FIG. 3b each depict the scanning sequence of zigzag scanning, using illustrative numbers and arrows, respectively; and FIG. 4 shows a system for compressing image data of the present invention.

DESCRIPTION OF THE PREFERRED EMBODIMENT

Figures 1, 2A, 2B:
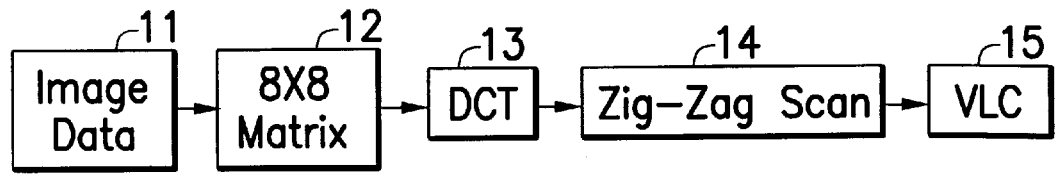
FIG. 1 shows a system for compressing image data of the prior art.
FIG. 2a and FIG. 2b each illustrate 8×8 matrices before and after DCT conversion, respectively.

Referring to FIG. 4, a system for compressing image data of the present invention is shown. At the beginning, image data 31 is distributed into an 8×8 matrix 32, as has been similarly shown in FIG. 2a. Then, the 8×8 matrix 32 is converted into another 8×8 matrix via DCT 33, again similarly to that shown in FIG. 2b. Through DCT 33, the 8×8 matrix 32 is converted from time domain to frequency domain. As had been the case previously shown in FIG. 2b, almost all cells of the converted 8×8 matrix would be reduced to zero after processing by DCT 33 except for the upper-left corner.

Referring back to FIG. 3a and 3b, as before, the numbers in FIG. 3a represent the scanning sequence of the related element in the matrix. The related element represented by "0" is first output in the scanning sequence and so forth. FIG. 3b utilizes arrows to show the same scanning sequence.

How the value of fixed delay X is obtained is explained below.

From the specific manner of DCT, the first row of the converted 8×8 matrix is not valid until the 8th clock after matrix conversion start and so forth. Thus, X must at first satisfy the following condition X+0>8 to read after elements of the 1st row are valid. The reason is that the elements of the first row in the matrix are not output from DCT until the 8th clock. Data output of the remaining rows follow the first row every 8 clocks, so X must totally satisfy the following equations:

X+0>8 (reading after elements of 1st row are valid)

X+2>16 (reading after elements of 2nd row are valid)

X+3>24 (reading after elements of 3rd row are valid)

X+9>32 (reading after elements of 4th row are valid)

X+10>40 (reading after elements of 5th row are valid)

X+20>48 (reading after elements of 6th row are valid)

X+21>56 (reading after elements of 7th row are valid)

X+35>64 (reading after elements of 8th row are valid)

So, there is a conclusion that X must be larger than 35 from 7th equation.

Another criterion is to prevent the overwriting of unread data, i.e. X must be smaller than some specific value. From FIG. 3a or 3b, it is known that the rightmost element in any row is always the last one that has been read out. The data of the rightmost element of 1st row would be re-written 64 clocks later after it is valid, so X must also satisfy the condition wherein X+28<64+8. Considering the remaining rows, X must totally satisfy the following equations:

X+28<72 (reading before elements of 1st row are rewritten)

X+42<80 (reading before elements of 2nd row are rewritten)

X+43<88 (reading before elements of 3rd row are rewritten)

X+53<96 (reading before elements of 4th row are rewritten)

X+54<104 (reading before elements of 5th row are rewritten)

X+60<112 (reading before elements of 6th row are rewritten)

X+61<120 (reading before elements of 7th row are rewritten)

X+63<128 (reading before elements of 8th row are rewritten)

Thus, X must be smaller than 38 from the 2nd equation. Finally, X must be 36 or 37.

Then, zigzag scan 35 can serialize the matrix into a serial chain by placing non-zero values in the front of the serial chain and all zeros to the end. VLC 36 then codes the serial chain from zigzag scan 35.

In addition, the present invention provides a device for compressing image data. The device for compressing image data comprises: a matrix distributer, distributing image data 31 into an 8×8 matrix 32 as shown in FIG. 2a; a DCT converter, converting the 8×8 matrix 32 into a second 8×8 matrix in DCT manner; a means for fixed delay, introducing a fixed delay X after said conversion starts simultaneously; and a scanning device, performing a zigzag scan to read each row of said second matrix into a serial chain.

Through the DCT converter, the 8×8 matrix 32 is converted from time domain into frequency domain. As shown in FIG. 2b, almost all elements in the second matrix are reduced to zero except for the upper-left corner. The fixed delay X is of 36 or 37 clocks.

Approximately half the number of transistors is required to implement the present invention compared to the prior art. Nowadays, circuit designs using fewer transistors and resulting in smaller chip size always helps increase product competitiveness.

Having described the invention in connection with preferred embodiments, modifications will now doubtlessly be apparent to those skilled in this technology. The foregoing description of the preferred embodiment of the invention has been provided for the purposes of illustration and description. It is not intended to be exhaustive or to limit the invention to the precise embodiment disclosed herein. The disclosed embodiment has been chosen and described to best explain the principles of the invention and its practical application, thereby enabling others skilled in this technology to understand the invention, to practice various other embodiments thereof and to make various modifications suited to the particular use contemplated of the present invention. As such, it is intended that the scope of this invention shall not be limited to the disclosed, but rather shall be defined by the following claims and their equivalents.

What is claimed is:

1. A method for compressing image data, comprising:

providing image data;

distributing said image data into a first matrix;

converting said first matrix into a second matrix by a conversion;

introducing a fixed delay after said conversion starts, said fixed delay comprising 36 clocks;

performing a zigzag scan to read each row of said second matrix into a serial chain; and coding said serial chain from said zigzag scan.

2. The method for compressing image data of claim 1, wherein said first matrix is an 8×8 matrix.

3. The method for compressing image data of claim 1, wherein said conversion is DCT which converts said first matrix from time domain into frequency domain.

4. The method for compressing image data of claim 1, wherein said second matrix is an 8×8 matrix with almost all elements reduced to zero except for the upper-left corner.

5. A method for compressing image data, comprising:

providing image data;

distributing said image data into a first matrix;

converting said first matrix into a second matrix by a conversion;

introducing a fixed delay after said conversion starts, said fixed delay is of 37 clocks, performing a zigzag scan to read each row of said second matrix into a serial chain; and coding said serial chain from said zigzag scan.

6. The method for compressing image data of claim 1, wherein said coding methodology is VLC.

7. The method for compressing image data of claim 5, wherein said first matrix is an 8×8 matrix.

8. The method for compressing image data of claim 5, wherein said conversion is DTC which converts said first matrix from time domain into frequency domain.

9. The method for compressing image data of claim 5, wherein said second matrix is an 8×8 matrix with almost all elements reduced to zero except for the upper-left corner.

10. The method for compressing image data of claim 5, wherein said coding methodology is VLC.

11. A device for compressing image data, comprising:

a matrix distributer, distributing said image data into a first matrix;

a converter, converting said first matrix into a second matrix;

a means for fixed delay, introducing a fixed delay after said conversion starts said fixed delay comprising 36 clocks; and a scanning device, performing a zigzag scan to read each row of said second matrix into a serial chain.

12. The device for compressing image data of claim 11, wherein said first matrix is an 8×8 matrix.

13. The device for compressing image data of claim 11, wherein said converter is a DCT converter which converts said first matrix from time domain into frequency domain.

14. The device for compressing image data of claim 11, wherein said second matrix is an 8×8 matrix with almost all elements reduced to zero except for the upper-left corner.

15. A device for compressing image data, comprising:

a matrix distributer, distributing said image data into a first matrix;

a converter, converting said first matrix into a second matrix;

a means for fixed delay introducing a fixed delay after said conversion starts, said fixed delay is of 37 clocks; and a scanning device, performing a zigzag scan to read each row of said second matrix into a serial chain.

16. The device for compressing image data of claim 15, wherein said first matrix is an 8×8 matrix.

17. The device for compressing image data of claim 15, wherein said converter is a DCT converter which converts said first matrix from time domain into frequency domain.

18. The device for compressing image data of claim 15, wherein said second matrix is an 8×8 matrix with almost all elements reduced to zero except for the upper-left corner.

* * * * *